United States Patent [19]

Morizumi

[11] Patent Number: 5,434,703
[45] Date of Patent: * Jul. 18, 1995

[54] BINOCULAR STEREOMICROSCOPE

[75] Inventor: Masaaki Morizumi, Ohmiya, Japan

[73] Assignee: Fuji Photo Optical Co., Ltd., Saitama, Japan

[ * ] Notice: The portion of the term of this patent subsequent to Nov. 30, 2010 has been disclaimed.

[21] Appl. No.: 147,164

[22] Filed: Nov. 2, 1993

Related U.S. Application Data

[62] Division of Ser. No. 919,895, Jul. 27, 1992, abandoned.

[30] Foreign Application Priority Data

Oct. 9, 1991 [JP] Japan .................. 3-261836
Oct. 9, 1991 [JP] Japan .................. 3-261837
Oct. 9, 1991 [JP] Japan .................. 3-261838

[51] Int. Cl.⁶ .................. G02B 21/06; G01J 1/20
[52] U.S. Cl. .................. 359/385; 359/368; 359/380; 250/201.3

[58] Field of Search .................. 359/368–371, 359/376–378, 381, 383, 385–386; 250/201.2–201.8, 204, 225; 351/204, 205, 208, 211, 213–215, 221, 233, 237,243; 356/357–359

[56] References Cited

U.S. PATENT DOCUMENTS 4,047,022  9/1977  Holle .................. 250/201.7
5,266,791 11/1993  Monzumi .................. 250/201.3

*Primary Examiner*—Loha Ben
*Assistant Examiner*—Thong Nguyen
*Attorney, Agent, or Firm*—Brumbaugh, Graves, Donohue & Raymond

[57] ABSTRACT

A binocular stereomicroscope is provided with a binocular magnifying optical system and an objective lens unit, which is located in front of the binocular magnifying optical system. The objective lens unit is composed of a stationary objective lens and a movable objective lens. A focusing operation is carried out by movement of the movable objective lens. With the binocular stereomicroscope, a smooth, quick, and accurate focusing function can be achieved, and positions of the eyes of an operator need not be shifted in accordance with the focusing operation.

7 Claims, 5 Drawing Sheets

BINOCULAR STEREOMICROSCOPE

This application is a division of application Ser. No. 07/919,895, filed on Jul. 27, 1992, now abandoned.

BACKGROUND OF THE INVENTION

1. Field of the Invention

This invention relates to a binocular stereomicroscope for use as a microscope for surgical operations, or the like.

2. Description of the Prior Art

For example, when surgical operations are carried out on minute diseased parts, enlarged images of the diseased parts have heretofore been formed with binocular stereomicroscopes, and the diseased parts have heretofore been treated by seeing the enlarged images. Such a binocular stereomicroscope comprises an objective lens and a magnifying optical system, which substantially constitutes a binocular magnifier and which is located at the rear of the objective lens. In order to adjust the focusing point of the binocular stereomicroscope, a mechanism provided with a rack and pinion, which is formed on a stay and which vertically or horizontally moves the whole binocular stereomicroscope, has been put into practice.

Also, a binocular stereomicroscope has heretofore been known which is provided with an illumination means for illuminating an object. The illumination means is constituted such that a light beam produced by a light source may pass through an objective lens and may then impinge upon the object.

However, in cases where the mechanism is employed which carries out the focusing operation by moving the whole binocular stereomicroscope such that the position of the object may coincide with the position of the focal length of the objective lens, it becomes necessary to provide a considerably large-scaled structure in order to move the heavy mass and then keep it stationary at an arbitrary position. Also, a special member or mechanism is often required to fix the heavy mass at an arbitrary position.

As a result, the whole binocular stereomicroscope, including the focusing mechanism, becomes large in size and heavy in weight. Therefore, the focusing operation and movement of the binocular stereomicroscope cannot be carried out smoothly. Also, the cost of the binocular stereomicroscope cannot be kept low. In particular, in cases where the binocular stereomicroscope is used for a surgical operation and a state of emergency, e.g., bleeding, occurs during the surgical operation, the binocular stereomicroscope must be removed from the object, and an urgent treatment must be carried out on the object. When the surgical operation is again carried out on the object, it is necessary to carry out a re-focusing operation. Thus, movement and the focusing operation of the binocular stereomicroscope must be carried out in addition to the treatment on the diseased part. Therefore, there is the risk that the surgical operation cannot be carried out quickly.

A binocular stereomicroscope may be constituted such that the focusing operation may be carried out automatically in accordance with a signal obtained from a distance measuring means. However, in such cases, if the focusing operation is carried out by moving the heavy part, a large focusing mechanism is required. Therefore, smooth, quick, and accurate operations cannot be carried out.

Moreover, with the conventional binocular stereomicroscope, its eyepieces move during the focusing operation. Therefore, in order to observe a good microscope image, the positions of the eyes of the operator must be shifted in accordance with the focusing operation. Also, it will often occur that parts of the eyepieces strike against the eyes of the operator during the focusing operation. Thus a need exists for an improvement in the operability and image observation characteristics.

SUMMARY OF THE INVENTION

The primary object of the present invention is to provide a binocular stereomicroscope, which is provided with a compact focusing mechanism.

Another object of the present invention is to provide a binocular stereomicroscope, which is provided with an automatic focusing function and in which a distance measuring means for carrying out the automatic focusing operation is positioned compactly such that it may not adversely affect a binocular magnifying optical system and an illumination means.

The specific object of the present invention is to provide a binocular stereomicroscope, in which a phase difference detecting type of distance measurement is carried out accurately even if the contrast of the shape or pattern of an object is low.

The present invention provides a first binocular stereomicroscope provided with a binocular magnifying optical system and an objective lens unit, which is located in front of the binocular magnifying optical system, wherein the improvement comprises:
i) forming said objective lens unit from a stationary objective lens and a movable objective lens, and
ii) carrying out a focusing operation by movement of said movable objective lens.

With the first binocular stereomicroscope in accordance with the present invention, the objective lens unit is constituted of the stationary objective lens and the movable objective lens. During the focusing operation, the movable objective lens is moved to change the focal length of the lens system, and the lens system is thereby focused on the object. Therefore, the mass of parts, which are moved in accordance with the focusing operation, can be kept small, and the focusing operation can be carried out with a small operating force. Also, a smooth, quick, and accurate focusing function can be achieved. Additionally, eyepieces of the binocular stereomicroscope do not move in accordance with the focusing operation, and therefore the positions of the eyes of the operator need not be shifted. Accordingly, the first binocular stereomicroscope in accordance with the present invention exhibits good operability and good image observation characteristics. Moreover, in cases where an automatic focusing function is added to the first binocular stereomicroscope by utilizing an automatic movement mechanism provided with a motor, or the like, the first binocular stereomicroscope in accordance with the present invention enables quick and accurate control to be carried out.

The present invention also provides a second binocular stereomicroscope comprising:
i) an objective lens having a large aperture,
ii) a binocular magnifying optical system, which leads to right and left eyepieces and which is associated with sides rightward and leftward from a center part of the objective lens, and iii) an illuminating optical system for irradiating a light beam, which has been produced by a light source, to an object via the objective lens, wherein the improvement comprises:

a) locating said illuminating optical system on the side forward or rearward from said binocular magnifying optical system with respect to said objective lens, b) locating a distance measuring optical system of a distance measuring means on the side opposite to said illuminating optical system, said distance measuring means being of a phase difference detecting type, with which the amount of deviation of the position of image formation of an object image is found from a distance between object images re-formed at two positions, and c) providing an automatic focusing function for operating a focusing mechanism in accordance with a signal, which is obtained from said distance measuring means, and thereby carrying out a focusing operation.

With the second binocular stereomicroscope in accordance with the present invention, the light beam is projected from the illumination means onto the object. A light beam for image observation passes through the objective lens and the right and left sets of elements of the binocular magnifying optical system and thereafter impinges upon the eyepieces. In this manner, an enlarged image can be seen by the operator. Also, a light beam, which is utilized for distance measurement and which has passed through the objective lens, enters the phase difference detecting type of distance measuring optical system. In the phase difference detecting type of distance measuring optical system, images of the light beam for distance measurement are re-formed at two positions. The distance measuring means generates the signal in accordance with the distance between the images re-formed at the two positions. The focusing mechanism is operated in accordance with the signal, and the automatic focusing operation is thereby carried out.

Also, with the second binocular stereomicroscope in accordance with the present invention, because the distance measuring means is of the phase difference detecting type, the distance measurement can be carried out with a light beam other than the center light beam. The light beam utilized for distance measurement is taken from a region of the light beam coming from the object, which region is independent of the light beam for image observation. Additionally, the distance measuring optical system is located at a free area which does not interfere with the binocular magnifying optical system and the illumination means. In this manner, the automatic focusing function is positioned compactly such that it may not adversely affect the amount of light in the other functions. Because the second binocular stereomicroscope in accordance with the present invention is provided with the automatic focusing function, when the binocular stereomicroscope is moved and the distance between the binocular stereomicroscope and the object changes during surgical operations, or the like, manual focusing operations need not be carried out. Therefore, the operator can always see a sharp enlarged image and give close attention to treatment of the object. Accordingly, the second binocular stereomicroscope in accordance with the present invention is very advantageous in practice as a microscope for surgical operations, or the like.

The present invention further provides a third binocular stereomicroscope comprising:

i) a binocular magnifying optical system, ii) an objective lens, which is located in front of the binocular magnifying optical system, and iii) an illumination means for irradiating a light beam, which has been produced by a light source, to an object via the objective lens, wherein the improvement comprises the provision of:

a) a distance measuring means, which is of a phase difference detecting type and with which the amount of deviation of the position of image formation of an object image is found from a distance between object images reformed at two positions, b) a stripe filter, which is incorporated in an illuminating optical system of said illumination means and is provided with a striped pattern, said striped pattern transmitting visible light and not transmitting light having specific wavelengths close to a visible wavelength region, whereby a visible light beam is irradiated to said object, and at the same time a stripe image formed by said stripe filter is projected onto said object, and c) a visible light cutting filter, which is incorporated in a distance measuring optical system of said distance measuring means and which transmits said stripe image formed by the light having said specific wavelengths.

With the third binocular stereomicroscope in accordance with the present invention, the light beam is projected from the illumination means onto the object. A light beam for image observation passes through the objective lens and the right and left sets of elements of the binocular magnifying optical system and thereafter impinges upon the eyepieces. In this manner, an enlarged image can be seen by the operator. Also, the stripe filter is incorporated in the illuminating optical system, and therefore the invisible stripe image, which is formed by the light having specific wavelengths close to the visible wavelength region, can be projected without adversely affecting the enlarged object image to be observed. In the distance measuring means, the visible light cutting filter transmits only the stripe image. In the phase difference detecting type of distance measuring optical system, high-contrast images of a light beam for distance measurement are re-formed at two positions. The distance measuring means generates an accurate distance measurement signal in accordance with the distance between the images re-formed at the two positions. A focusing mechanism can be operated in accordance with the signal, and the automatic focusing operation can thereby be carried out quickly.

Also, with the third binocular stereomicroscope in accordance with the present invention, because the distance measuring means is of the phase difference detecting type, the distance measurement can be carried out with a light beam other than the center light beam, and the distance measuring means can be positioned compactly without adversely affecting the amount of light in the binocular magnifying optical system, or the like. Additionally, projection of the high-contrast stripe image for distance measurement and irradiation of the visible light beam onto the object can be carried out by using a single light source. Further, with the third binocular stereomicroscope in accordance with the present invention, even if the contrast of the object image is low, so that it is difficult to carry out the phase difference detecting type of distance measurement with a conventional binocular stereomicroscope, distance measurement can be carried out accurately by the projection of the stripe image.

As described above, with the third binocular stereomicroscope in accordance with the present invention, an automatic focusing function having good operability can be incorporated compactly in the binocular stereomicroscope. In cases where the automatic focusing function is thus incorporated in the third binocular stereomicroscope in accordance with the present invention, when the third binocular stereomicroscope is moved to the position for image observation, manual focusing operations need not be carried out. Therefore, the operator can always see a sharp enlarged image and give close attention to treatment of the object. Accordingly, the third binocular stereomicroscope in accordance with the present invention is very advantageous in practice as a microscope for surgical operations, or the like.

DESCRIPTION OF THE PREFERRED EMBODIMENTS

The present invention will hereinbelow be described in further detail with reference to the accompanying drawings.

Figure 1:
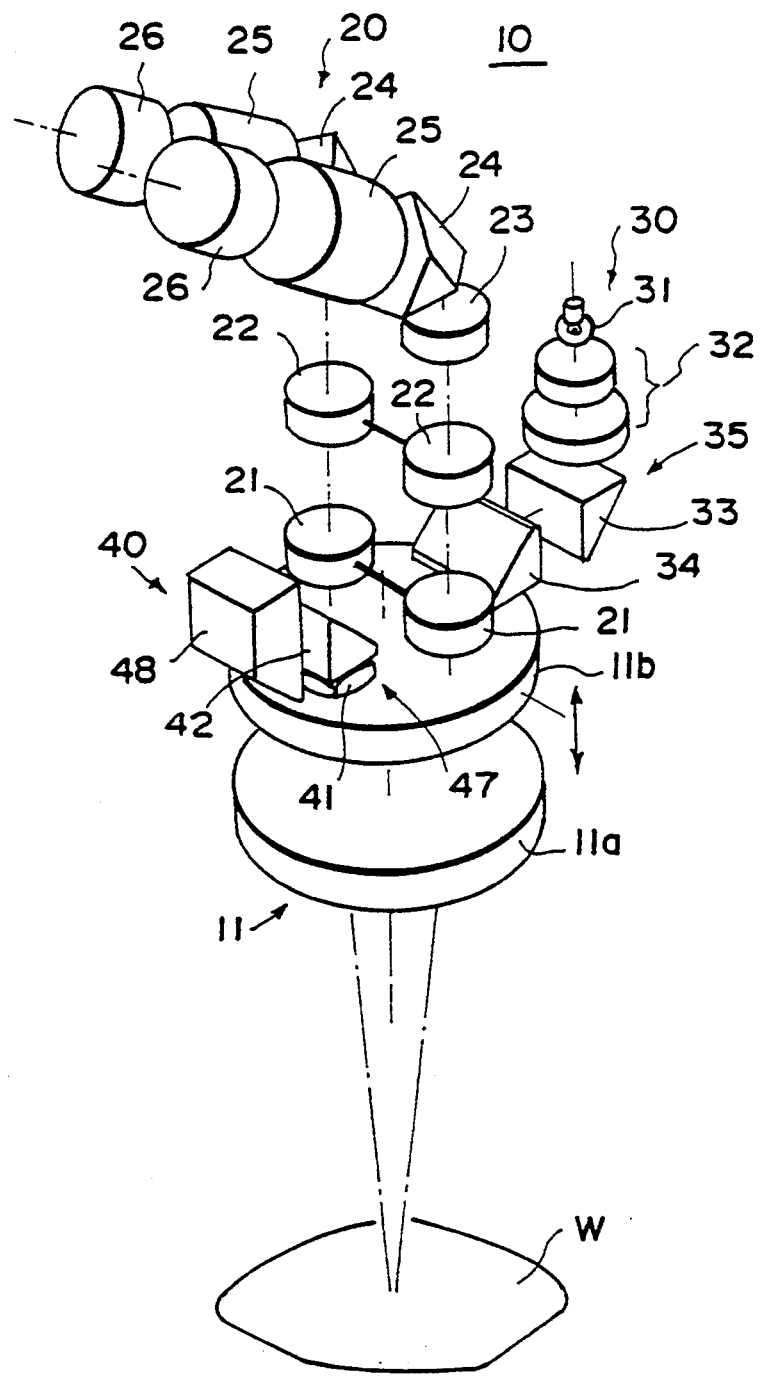
FIG. 1 is a schematic view showing an internal optical mechanism in a first embodiment of the binocular stereomicroscope in accordance with the present invention.

FIG. 1 is a schematic view showing an internal optical mechanism in a first embodiment of the binocular stereomicroscope in accordance with the present invention. This embodiment is provided with an automatic focusing function.

A binocular stereomicroscope 10 comprises a binocular magnifying optical system 20, an illumination means 30, and a distance measuring means 40, which are accommodated in an enclosed housing (not shown). An objective lens unit (objective lens) 11 having a large aperture is located facing an object W.

Figure 2:
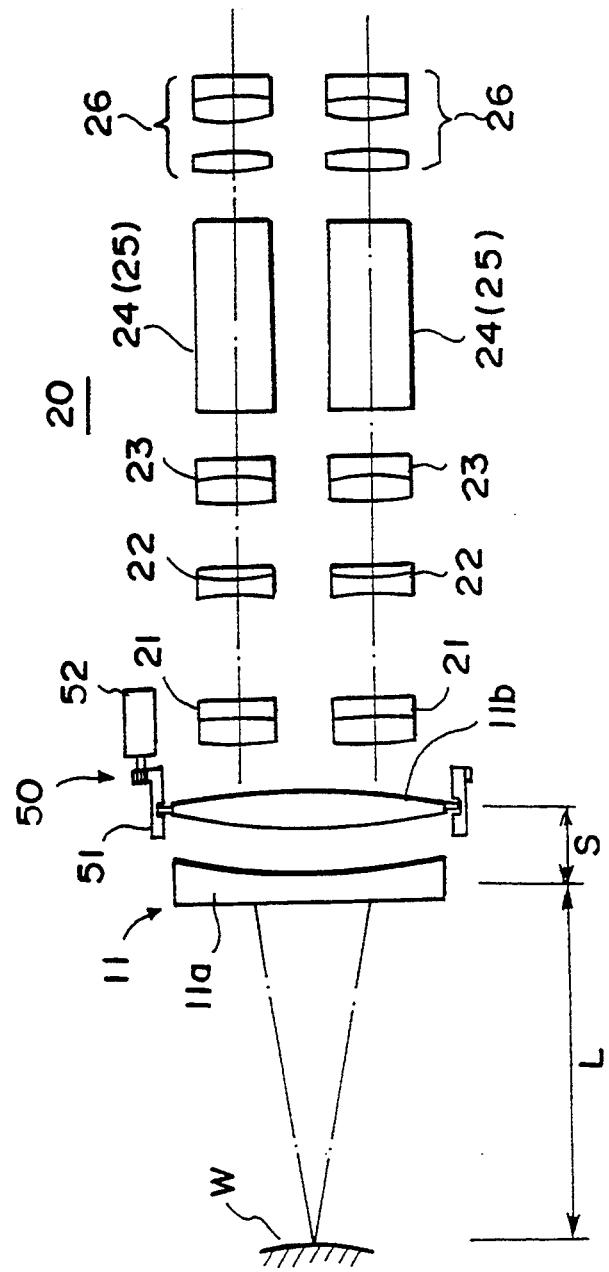
FIG. 2 is a schematic view showing a binocular magnifying optical system in the first embodiment of FIG. 1.

As illustrated also in FIG. 2, the objective lens unit 11 is constituted of a stationary objective lens 11a, which exhibits characteristics of a negative lens system (a concave lens) as a whole, and a movable objective lens 11b, which is located at the rear of the stationary objective lens 11a and exhibits characteristics of a positive lens system (a convex lens) as a whole. The movable objective lens 11b can be moved along the optical axis direction by a focusing mechanism 50, which will be described later, and a focusing operation is thereby carried out.

The binocular magnifying optical system 20 comprises right and left sets of elements for forming an enlarged image of the object W, which are located at the rear of the objective lens unit 11 (i.e., above the objective lens unit 11 in FIG. 1). The two sets of elements of the binocular magnifying optical system 20 are respectively located on the sides rightward and leftward from the center part of the objective lens unit 11. As illustrated also in FIG. 2, each of the right and left sets of elements of the binocular magnifying optical system 20 comprises a first zoom lens group 21, a second zoom lens group 22, a relay lens group 23, a first prism member 24, a second prism member 25, and an eyepiece (unit) 26, which are located in this order from the side of the objective lens unit 11.

The binocular magnifying optical system 20 serving as a fundamental structure of the binocular stereomicroscope 10 is constituted such that the objective lens unit 11 may be located in front of the binocular telescopic optical system ranging from the right and left first zoom lens groups 21, 21 to the eyepieces 26, 26, and the binocular stereomicroscope may be focused at a finite distance (i.e., a focusing distance L). The focusing distance L can be changed by moving the movable objective lens 11b of the objective lens unit 11 such that the binocular stereomicroscope may be focused at the position of the object W.

The illumination means 30 is located on the side forward from the binocular magnifying optical system 20 with respect to the objective lens unit 11. As illustrated also in FIG. 4, the illumination means 30 has an illuminating optical system 35. The illuminating optical system 35 is constituted of a light source (lamp) 31, a condensing lens group 32, and rectangular prisms 33 and 34. The light source 31, the condensing lens group 32, and the rectangular prism 33 are arrayed approximately parallel to the optical axis of the objective lens unit 11. The illumination means 30 irradiates a light beam to the object W via the objective lens unit 11.

Figure 4:
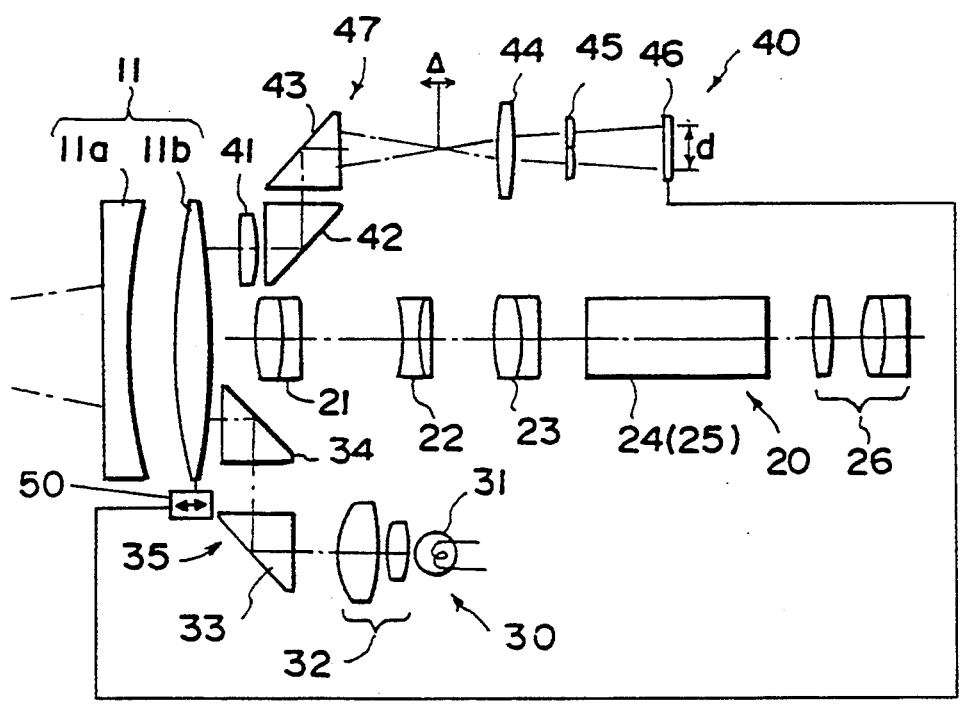
FIG. 4 is a schematic view showing a distance measuring optical system and an illuminating optical system in the first embodiment of FIG. 1.

The distance measuring means 40, which is of the phase difference detecting type, is located on the side opposite to the illumination means 30 (i.e., on the side rearward from the binocular magnifying optical system 20 with respect to the objective lens unit 11). As illustrated in FIG. 4, the distance measuring means 40 has a distance measuring optical system 47. The distance measuring optical system 47 comprises a distance measurement objective lens 41, distance measurement prisms 42 and 43, a field lens 44, a separator lens 45, and a line sensor 46 (a detection element), which are located in this order from the side of the objective lens unit 11. The line sensor 46, the separator lens 45, the field lens 44, and the distance measurement prism 43 are combined into a unit as a detection module 48 shown in FIG. 1.

In the distance measuring optical system 47, a light beam for distance measurement, which has come from the object W and has passed through the objective lens unit 11, passes through the distance measurement objective lens 41 and the prisms 42 and 43. An image of the light beam for distance measurement is formed in the vicinity of the field lens 44. The image thus formed passes through the field lens 44 and is separated into two parts by the separator lens 45. Images are thus re-formed at two positions on the line sensor 46. The distance d (pitch) between the two images re-formed on the line sensor 46 changes in accordance with a deviation (the amount of deviation Δ) of the position of image formation of the image, which is formed in the vicinity of the field lens 44, from the focusing position. The amount of deviation Δ is calculated from the distance d. The focusing mechanism 50 is operated such that the amount of deviation Δ may fall within a predetermined range, and an automatic focusing operation is thereby carried out.

In the distance measuring optical system 47, the distance measurement prisms 42 and 43 are not essential optically and need not necessarily be employed in cases where the position for the provision of the field lens 44, the separator lens 45, and the line sensor 46 is available.

As simply exemplified in FIG. 2, the focusing mechanism 50 may be constituted of a known mechanism such that the movable objective lens 11b of the objective lens unit 11 can be moved along the optical axis direction as a cam cylinder 51 rotates, and the cam cylinder 51 may be rotated by a motor 52. A distance measurement signal is obtained from a calculation process carried out on a signal, which is obtained from the line sensor 46 of the detection module 48. A drive signal for changing the focusing position in accordance with the distance measurement signal is fed into the motor 52 of the focusing mechanism 50, and the focal length of the lens system is thereby changed. In this manner, the binocular stereomicroscope is automatically focused on the object W.

Figure 3:
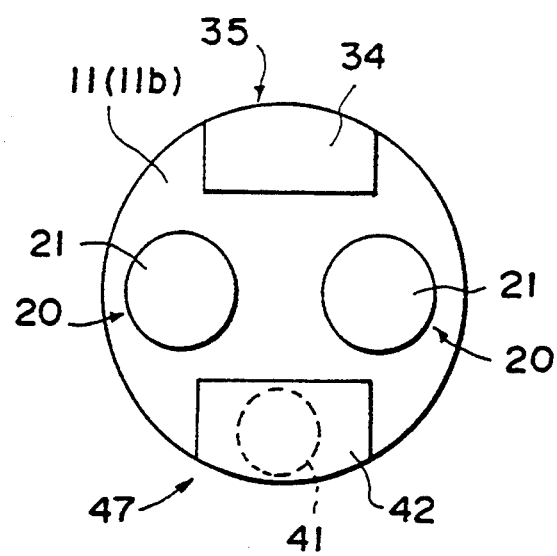
FIG. 3 is a schematic view showing the arrangement of optical systems with respect to an objective lens unit in the first embodiment of FIG. 1.

FIG. 3 is a plan view showing the arrangement of the optical systems with respect to the objective lens unit 11. With respect to the objective lens unit 11 having a large aperture, the right and left first zoom lens groups 21, 21 having a small aperture in the binocular magnifying optical system 20 are located on the sides rightward and leftward from the center part of the objective lens unit 11. The rectangular prism 34 of the illuminating optical system 35 is located on the side forward from the binocular magnifying optical system 20 and at the middle between the right and left first zoom lens groups 21, 21. The distance measurement objective lens 41 (the distance measurement prism 42) of the distance measuring optical system 47 is located on the side rearward from the binocular magnifying optical system 20 and at the middle between the right and left first zoom lens groups 21, 21. Alternatively, the distance measuring optical system 47 may be located on the side forward from the binocular magnifying optical system 20, and the illuminating optical system 35 may be located on the side rearward from the binocular magnifying optical system 20.

An example of how long the focusing distance changes with respect to the amount of movement of the movable objective lens 11b in the focusing mechanism 50 will be described hereinbelow. By way of example, the focal length f1 of the stationary objective lens 11a is 350 mm, and the focal length f2 of the movable objective lens 11b is 150 mm. In FIG. 2, when the center distance S between the stationary objective lens 11a and the movable objective lens 11b is changed within the range of 2 mm to 15 mm, the focusing distance L from the center point of the stationary objective lens 11a to the object W changes within the range of 256 mm to 220 mm. Specifically, when the movable objective lens 11b is moved by a distance of 13 mm, the focusing zone is 36 mm. By the movement of the movable objective lens 11b, the automatic focusing operation can be carried out for the object W, which is located in the focusing zone.

With the embodiment described above, the objective lens unit 11 is constituted of the two objective lenses. The stationary objective lens 11a is located on the side closer to the object, and the movable objective lens 11b is located on the side inward from the stationary objective lens 11a. The focusing operation is carried out by the movement of the movable objective lens 11b. Also, the automatic focusing operation can be carried out by the operation of the motor 52. Therefore, the mass of the parts moved during the focusing operation can be kept small, and the force for operating these parts can be reduced. Accordingly, a quick and accurate automatic focusing operation can be carried out. Additionally, because the movable objective lens 11b, which is moved during the focusing operation, is located on the side inward from the stationary objective lens 11a, it becomes easy to employ a sealed structure. Further, good quality can be obtained reliably by virtue of the absence of moving parts at the outer area. In particular, the binocular stereomicroscope can be provided with a water-tight structure. Therefore, in cases where the binocular stereomicroscope is utilized for medical purposes, it is advantageous in that it can be easily sterilized and washed.

Also, with the embodiment described above, the space and the optical path at the objective lens unit 11, which are not used for the binocular magnifying optical system 20, are utilized efficiently. The illuminating optical system 35 of the illumination means 30 and the distance measuring optical system 47 of the distance measuring means 40 are located in such a free space. The phase difference detecting type of distance measuring means 40, which can measure the distance with a light beam other than the center light beam, is located at the place which has not heretofore been utilized. Also, the focusing mechanism 50 is provided which moves part of the objective lens unit 11. Therefore, the binocular stereomicroscope 10, which is provided with the automatic focusing function capable of quickly carrying out the focusing operation, can be kept compact. Additionally, the optical systems do not interfere with one another and do not separate the light beam. Therefore, no loss occurs in the amount of light of the enlarged image and in the amount of the illuminating light beam. As a result, image observation, illumination, and distance measurement can be carried out appropriately. Moreover, addition of the automatic focusing function to a binocular stereomicroscope having a conventional structure can be carried out by slightly changing the structure.

Additionally, the distance measuring optical system 47 is located at the rear of the objective lens unit 11. Therefore, even if the objective lens unit 11 is replaced by a new one and the total magnification of the binocular stereomicroscope 10 is thereby changed, the distance measuring function is not affected by the replacement of the objective lens unit 11, and the automatic focusing function can be obtained by connecting the focusing mechanism 50 to the new objective lens unit 11.

In the aforesaid embodiment, the automatic focusing mechanism is constituted such that the movable objective lens 11b may be moved by the motor 52. Alternatively, the movable objective lens 11b may be moved manually for the focusing purposes. Also, instead of the cam mechanism being employed, the focusing mechanism 50 may be constituted of a known lens movement mechanism.

Moreover, in the aforesaid embodiment, the focusing mechanism 50 for moving part of the objective lens unit 11 is utilized, and the focusing operation is carried out by changing the focal length of the lens system in accordance with the signal generated by the distance measuring means 40. Alternatively, as the focusing mechanism, a drive means may be utilized which moves the whole binocular stereomicroscope along the optical axis direction, the drive means may be operated such that the position of the object W may coincide with the position of the focal length of the objective lens unit 11, and the automatic focusing operation may thereby be carried out.

Figure 5:
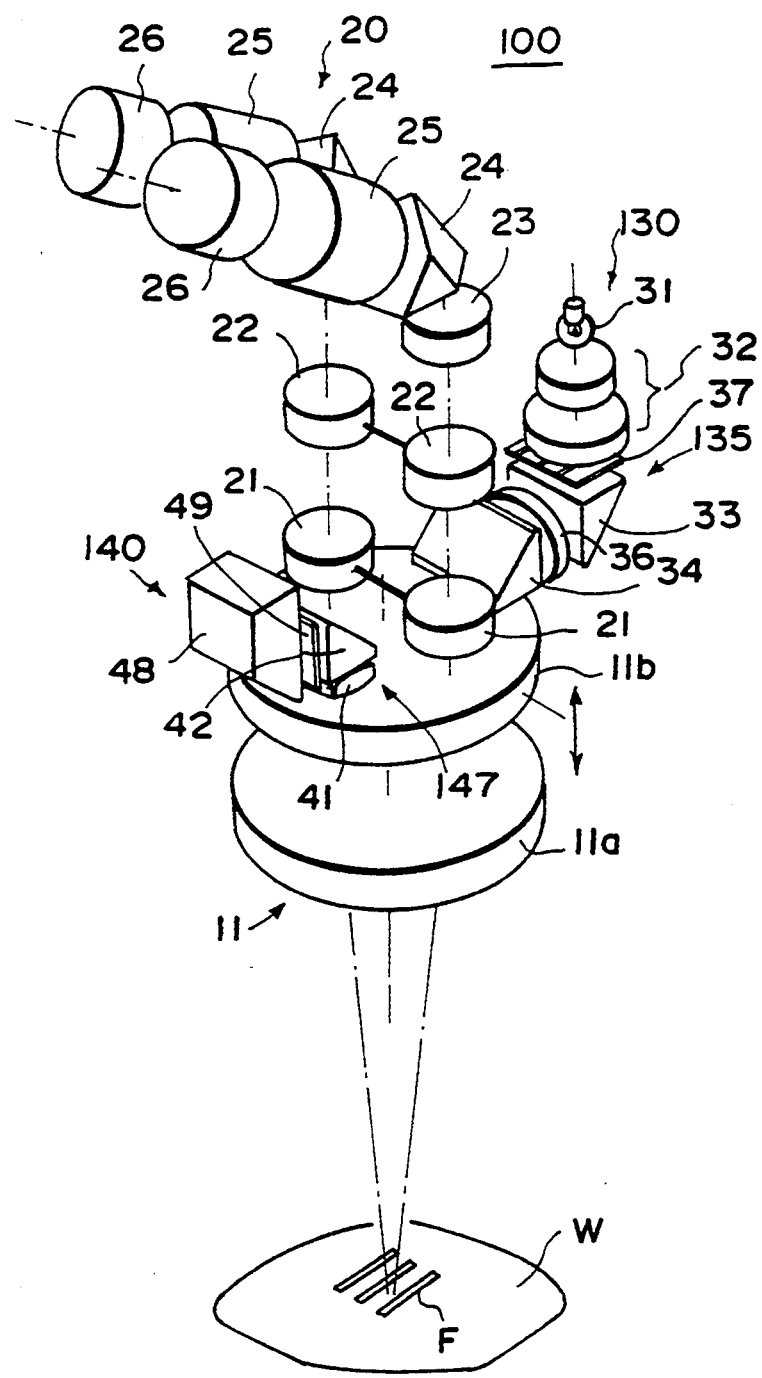
FIG. 5 is a schematic view showing an internal optical mechanism in a second embodiment of the binocular stereomicroscope in accordance with the present invention.
Figure 6:
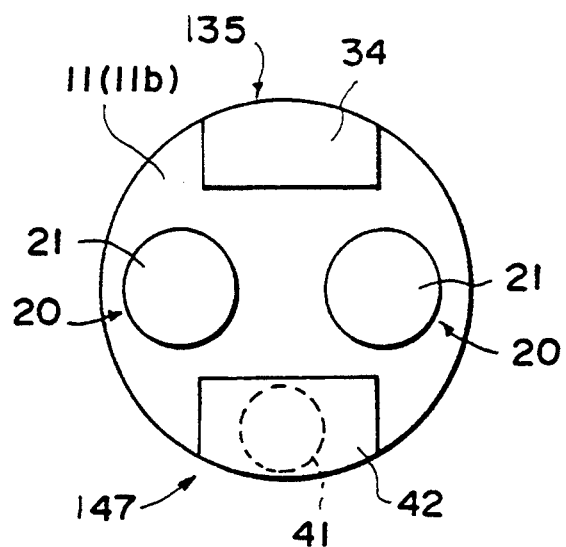
FIG. 6 is a schematic view showing the arrangement of optical systems with respect to an objective lens unit in the second embodiment of FIG. 5.
Figure 7:
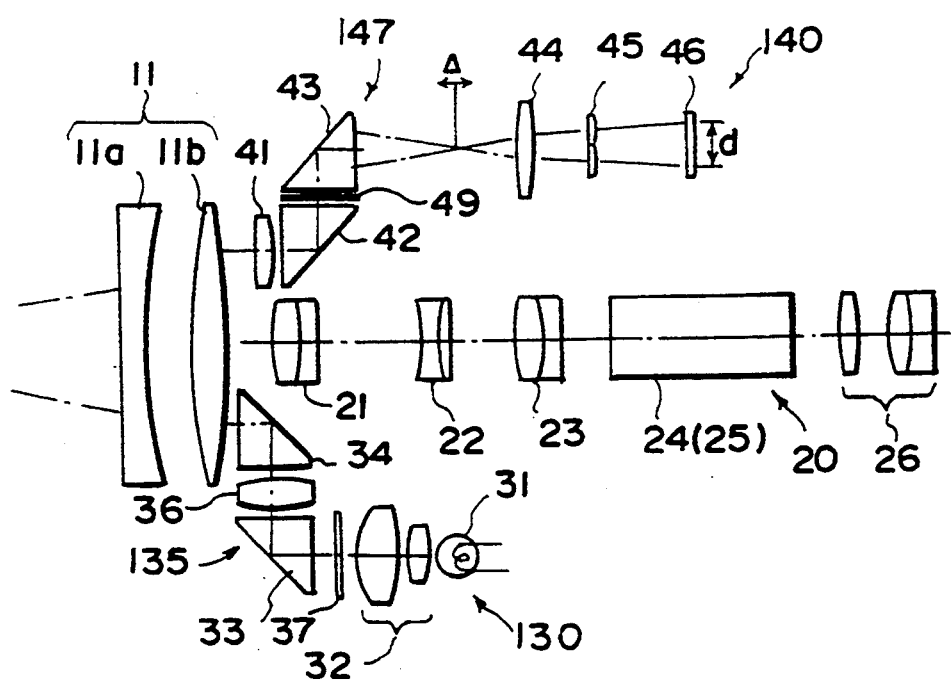
FIG. 7 is a schematic view showing a distance measuring optical system and an illuminating optical system in the second embodiment of FIG. 5.

A second embodiment of the binocular stereomicroscope in accordance with the present invention will be described hereinbelow with reference to FIGS. 5, 6, and 7. In FIGS. 5, 6, and 7, similar elements are numbered with the same reference numerals with respect to FIGS. 1, 3, and 4.

FIG. 5 is a schematic view showing an internal optical mechanism in the second embodiment of the binocular stereomicroscope in accordance with the present invention.

A binocular stereomicroscope 100 comprises a binocular magnifying optical system 20, an illumination means 130, and a distance measuring means 140, which are accommodated in an enclosed housing (not shown). The objective lens (unit) 11 having a large aperture is located facing the object W. The objective lens (unit) 11 and the binocular magnifying optical system 20 are constituted in the same manners as those in the first embodiment of FIG. 1.

The illumination means 130 is located on the side forward from the binocular magnifying optical system 20 with respect to the objective lens 11. As illustrated also in FIG. 7, the illumination means 130 has an illuminating optical system 135. The illuminating optical system 135 is constituted of the light source (lamp) 31, the condensing lens group 32, a stripe filter 37, rectangular prisms 33 and 34, and a relay lens 36. The light source 31, the condensing lens group 32, the stripe filter 37, and the rectangular prism 33 are arrayed approximately parallel to the optical axis of the objective lens 11. The illumination means 130 irradiates a light beam to the object W via the objective lens 11.

The stripe filter 37 is provided with a striped pattern, which completely transmits visible light and does not transmit light (infrared light or ultraviolet light) having specific wavelengths close to the visible wavelength region. Specifically, the striped pattern is constituted of parts for reflecting light having specific wavelengths and parts for transmitting light having the specific wavelengths. The two types of parts are located alternately to form an unequally spaced pattern such that a projected stripe image F appropriate as a target image for the phase difference detection can be obtained on the object W.

The stripe image F, which has been formed by the stripe filter 37, is re-formed on the object W by the illuminating optical system 135 and the objective lens 11. Specifically, the light beam, which has been produced by the light source 31, passes through the condensing lens group 32 and then impinges upon the stripe filter 37. Visible light completely passes through the stripe filter 37, but light having specific wavelengths close to the visible wavelength region is reflected by or passes through the stripe filter 37 in accordance with the striped pattern. The light beam, which has passed through the stripe filter 37, passes through the rectangular prisms 33 and 34, the relay lens 36, and the objective lens 11 and thereafter impinges upon the object W. The condensing lens group 32 forms an image of the filament of the light source 31 at a point in the vicinity of the pupil of the relay lens 36. The condensing lens group 32 is constituted such that the distribution of the amount of light on the stripe filter 37 may be uniform and nonuniformity may not occur in the amount of light even after the light beam has passed through the relay lens 36 and the objective lens 11. The stripe image F is re-formed on the object W by the relay lens 36 and the objective lens 11.

The distance measuring means 140, which is of the phase difference detecting type, is located on the side opposite to the illumination means 130 (i.e., on the side rearward from the binocular magnifying optical system 20 with respect to the objective lens 11). As illustrated in FIG. 7, the distance measuring means 140 has a distance measuring optical system 147. The distance measuring optical system 147 comprises the distance measurement objective lens 41, the distance measurement prisms 42 and 43, the field lens 44, the separator lens 45, and the line sensor 46 (a detection element), which are located in this order from the side of the objective lens 11. The line sensor 46, the separator lens 45, the field lens 44, and the distance measurement prism 43 are combined into a unit as the detection module 48 shown in FIG. 5. A visible light cutting filter 49 is located between the distance measurement prisms 42 and 43 of the distance measuring optical system 147. The visible light cutting filter 49 blocks visible light and transmits only the stripe image F, which is formed by the light having the specific wavelengths, towards the line sensor 46. Also, the line sensor 46 has the characteristics capable of detecting the image formed by the light having the specific wavelengths.

In the distance measuring optical system 147, the stripe image F for distance measurement, which has come from the object W and has passed through the objective lens 11, passes through the distance measurement objective lens 41 and the prisms 42 and 43. An image is thereby formed in the vicinity of the field lens 44. The image thus formed passes through the field lens 44 and is separated into two parts by the separator lens 45. Images are thus re-formed at two positions on the line sensor 46. The distance d (pitch) between the two images re-formed on the line sensor 46 changes in accordance with a deviation (the amount of deviation Δ) of the position of image formation of the image, which is formed in the vicinity of the field lens 44, from the focusing position. The amount of deviation Δ is calculated from the distance d. The focusing mechanism 50 (shown in FIG. 2) is operated such that the amount of deviation Δ may fall within a predetermined range, and an automatic focusing operation is thereby carried out. A sharp contrast can be obtained with the stripe image, and therefore the detection accuracy can be kept high.

In the distance measuring optical system 147, the distance measurement prisms 42 and 43 are not essential optically and need not necessarily be employed in cases where the position for the provision of the visible light cutting filter 49, the field lens 44, the separator lens 45, and the line sensor 46 is available.

FIG. 6 is a plan view showing the arrangement of the optical systems with respect to the objective lens 11. With respect to the objective lens 11 having a large aperture, the right and left first zoom lens groups 21, 21 having a small aperture in the binocular magnifying optical system 20 are located on the sides rightward and leftward from the center part of the objective lens 11.

The rectangular prism 34 of the illuminating optical system 135 is located on the side forward from the binocular magnifying optical system 20 and at the middle between the right and left first zoom lens groups 21, 21. The distance measurement objective lens 41 (the distance measurement prism 42) of the distance measuring optical system 147 is located on the side rearward from the binocular magnifying optical system 20 and at the middle between the right and left first zoom lens groups 21, 21. Alternatively, the distance measuring optical system 147 may be located on the side forward from the binocular magnifying optical system 20, and the illuminating optical system 135 may be located on the side rearward from the binocular magnifying optical system 20.

With the second embodiment described above, the object W is uniformly illuminated with visible light by the action of the illumination means 130. At the same time, the stripe image F, which is formed by invisible light (infrared light or ultraviolet light) having specific wavelengths close to the visible wavelength region, is projected onto the object W. Even if the contrast of the object image is low as in the cases of images of surfaces of the internal organs, or the like, reliable distance measurement can be carried out in accordance with the stripe image F, and a quick automatic focusing function can be obtained. Also, the stripe image F for distance measurement is invisible. Additionally, even if a single light source is utilized for the illumination with visible light and for the formation of the stripe image, no loss in the amount of light occurs, and no adverse effects occur on the observation of the enlarged image. Therefore, the binocular stereomicroscope can be kept low in cost and compact in size.

Also, with the second embodiment described above, the space and the optical path at the objective lens 11, which are not used for the binocular magnifying optical system 20, are utilized efficiently. The illuminating optical system 135 of the illumination means 130 and the distance measuring optical system 147 of the distance measuring means 140 are located in such a free space. The phase difference detecting type of distance measuring means 140, which can measure the distance with a light beam other than the center light beam, is located at the place which has not heretofore been utilized. Also, the focusing mechanism 50 is provided which moves part of the objective lens 11. Therefore, the binocular stereomicroscope 100, which is provided with the automatic focusing function capable of quickly carrying out the focusing operation, can be kept compact. Additionally, the optical systems do not interfere with one another and do not separate the light beam. Therefore, no loss occurs in the amount of light of the enlarged image and in the amount of the illuminating light beam. As a result, image observation, illumination, and distance measurement can be carried out appropriately. Moreover, addition of the mechanism for projecting the stripe image and the automatic focusing function to a binocular stereomicroscope having a conventional structure can be carried out by slightly changing the structure.

Additionally, the distance measuring optical system 147 is located at the rear of the objective lens 11. Therefore, even if the objective lens 11 is replaced by a new one and the total magnification of the binocular stereomicroscope 100 is thereby changed, the distance measuring function is not affected by the replacement of the objective lens 11, and the automatic focusing function can be obtained by connecting the focusing mechanism 50 to the new objective lens 11.

In the second embodiment described above, the focusing mechanism 50 for moving part of the objective lens 11 is utilized, and the focusing operation is carried out by changing the focal length of the lens system in accordance with the signal generated by the distance measuring means 140. Alternatively, as the focusing mechanism, a drive means may be utilized which moves the whole binocular stereomicroscope along the optical axis direction, the drive means may be operated such that the position of the object W may coincide with the position of the focal length of the objective lens 11, and the automatic focusing operation may thereby be carried out.

The binocular stereomicroscope in accordance with the present invention is applicable to surgical operations, other medical purposes, experiments, and the like.

What is claimed is:

1. A binocular stereomicroscope comprising:
   an objective lens having a large aperture,
   a binocular magnifying optical system, which leads to right and left eyepieces and which is associated with sides rightward and leftward from a center part of the objective lens, and
   an illuminating optical system for irradiating a light beam, which has been produced by a light source, to an object via the objective lens,
   the illuminating optical system being located on the side forward or rearward from said binocular magnifying optical system with respect to said objective lens,
   and further comprising a distance measuring optical system of a distance measuring means located on the side opposite to said illuminating optical system, said distance measuring means forming two spaced images of an object, wherein an amount of deviation of a position of image formation of an object image is found from a distance between the two spaced images, and
   an automatic focusing means for operating a focusing mechanism in accordance with a signal, which is obtained from said distance measuring means, and thereby carrying out a focusing operation.

2. A binocular stereomicroscope as defined in claim 1 wherein said objective lens is composed of a stationary objective lens and a movable objective lens, and said focusing means includes means for moving said movable objective lens.

3. A binocular stereomicroscope as defined in claim 2 wherein said movable objective lens is located on the side inward from said stationary objective lens.

4. A binocular stereomicroscope comprising
   a binocular magnifying optical system;
   an objective lens, which is located in front of the binocular magnifying optical system, and
   an illumination means for irradiating a light beam, which has been produced by a light source, to an object via the objective lens,
   a distance measuring means forming two spaced images of an object, wherein an amount of deviation of a position of image formation of an object image is found from a distance between the two spaced images,
   a stripe filter, which is incorporated in an illuminating optical system of said illumination means and is provided with a striped pattern, said striped pattern transmitting visible light and not transmitting light having specific wavelengths close to a visible wavelength region, whereby a visible light beam is irradiated to said object, and at the same time a stripe image formed by said stripe filter is projected onto said object, and a visible light cutting filter, which is incorporated in a distance measuring optical system of said distance measuring means and which transmits said stripe image formed by the light having said specific wavelengths.

5. A binocular stereomicroscope as defined in claim 4 wherein said objective lens is composed of a stationary objective lens and a movable objective lens, and focusing means for moving said movable objective lens.

6. A binocular stereomicroscope as defined in claim 5 wherein said movable objective lens is automatically moved by the focusing means in accordance with a signal generated by said distance measuring means.

7. A binocular stereomicroscope as defined in claim 5 wherein said movable objective lens is located on the side inward from said stationary objective lens.

* * * * *